(12) United States Patent
Vargantwar (10) Patent No.: US 9,042,930 B1
(45) Date of Patent: May 26, 2015

(54) METHOD AND SYSTEM FOR REDUCING FORWARD LINK TRANSMISSION POWER

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 394 days.

(21) Appl. No.: 12/880,880

(22) Filed: Sep. 13, 2010

(51) Int. Cl.
*H04B 7/00* (2006.01)

(52) U.S. Cl.
CPC .................................. *H04B 7/00* (2013.01)

(58) Field of Classification Search
CPC ........ H04B 7/00; H04B 1/713; H04W 72/005
See application file for complete search history.

(56) References Cited

U.S. PATENT DOCUMENTS

| | | | |
|---|---|---|---|
| 6,405,052 B1* | 6/2002 | Faber | 455/522 |
| 6,603,825 B1* | 8/2003 | Pecen | 375/345 |
| 7,006,475 B1* | 2/2006 | Suzuki et al. | 370/335 |
| 7,239,886 B2 | 7/2007 | Gross et al. | |
| 8,325,648 B1* | 12/2012 | Shah et al. | 370/318 |
| 2005/0136959 A1* | 6/2005 | Hellwig et al. | 455/522 |
| 2008/0057934 A1* | 3/2008 | Sung et al. | 455/422.1 |
| 2008/0069020 A1* | 3/2008 | Richardson | 370/311 |
| 2009/0061848 A1* | 3/2009 | Hurst et al. | 455/425 |
| 2009/0103511 A1* | 4/2009 | Marinier et al. | 370/345 |
| 2009/0180517 A1* | 7/2009 | Lee et al. | 375/130 |
| 2009/0193301 A1* | 7/2009 | Ito et al. | 714/704 |
| 2010/0208675 A1* | 8/2010 | Song et al. | 370/329 |
| 2010/0260086 A1* | 10/2010 | Santhanam et al. | 370/311 |
| 2010/0329225 A1* | 12/2010 | Balasubramanian | 370/338 |
| 2011/0075740 A1* | 3/2011 | Ferraiolo et al. | 375/257 |
| 2011/0143804 A1* | 6/2011 | Blomgren et al. | 455/522 |
| 2011/0182272 A1* | 7/2011 | Santhanam et al. | 370/332 |
| 2011/0211564 A1* | 9/2011 | Yoneyama et al. | 370/338 |
| 2012/0021788 A1* | 1/2012 | Yavuz et al. | 455/501 |

\* cited by examiner

*Primary Examiner* — Bobbak Safaipour (57) ABSTRACT

This specification describes a method and corresponding system for reducing aggregate forward link transmission power. In one arrangement, a RAN may reduce the aggregate transmission power level in a coverage area by (i) determining which WCDs in the coverage area have a communication error rate that is at least a threshold level of communication error rate, and in response to the determining, (ii) reducing the forward link transmission power level of the determined WCDs. In another arrangement, the RAN may reduce the aggregate transmission power level in a coverage area by reducing the forward link transmission power of WCDs in the coverage area that have (i) a forward link transmission power level that is at least a threshold level of forward link transmission power and (ii) a communication error rate that is at least a threshold level of communication error rate.

20 Claims, 5 Drawing Sheets

METHOD AND SYSTEM FOR REDUCING FORWARD LINK TRANSMISSION POWER

BACKGROUND

In typical cellular wireless communication systems, wireless communication devices (WCDs) (e.g., cell phones, personal digital assistants, laptops, netbooks, tablets, and/or other wirelessly equipped devices) subscribe to service from a given cellular wireless service provider. In practice, a cellular wireless service provider will operate one or more radio access networks (RANs) including base transceiver stations (BTSs) that radiate radio frequency (RF) patterns to define wireless coverage areas where the subscriber WCDs can operate.

Within each coverage area, the radiated RF pattern may provide one or more wireless links over which a WCD can obtain connectivity to broader networks such as the public switched telephone network (PSTN) and the Internet. Further, each RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a WCD that is positioned within coverage of the RAN can then communicate with a BTS and in turn, via the BTS, with other served devices or with other entities on the transport network.

The wireless links may carry communications between the RAN and the WCDs according to any of a variety of wireless protocols. Depending on the protocol employed, each wireless link may also be divided into a plurality of channels for carrying communications between the RAN and the WCDs. For example, each wireless link may include a plurality of forward link channels, such as forward traffic channels, for carrying communications from the RAN to the WCDs. As another example, each wireless link may include a plurality of reverse-link channels, such as reverse traffic channels, for carrying communications from the WCDs to the RAN.

In many wireless protocols, the RAN and WCDs that are actively communicating with the RAN ("active WCDs") may engage in a power-control process to control transmission power for communications over established traffic channels. In an example forward-link power control process, an active WCD may regularly send power control commands (PCCs) (e.g., a "power up" command or a "power down" command) directed to the RAN, to control the RAN's transmission power on a forward traffic channel to the active WCD. For example, during a communication session between an active WCD and the RAN, the active WCD may regularly compare the power level of received transmissions to a power level set point and thereby decide whether to send a power up command that instructs the RAN to increase its forward transmission power to the active WCD or a power down command that instructs the RAN to decrease its forward transmission power to the active WCD.

For instance, if the received power level of the active WCD is less than the active WCD's power level set point, the active WCD may send a power up command directed to the RAN. Alternatively, if the received power level of the active WCD is greater than the active WCD's power level set point, the active WCD may send a power down command directed to the RAN.

A WCD may adjust the power level set point up or down based on a variety of computations. One such computation is a communication error rate computation. For example, during a communication session between an active WCD and the RAN, the active WCD may regularly calculate a rate of communication errors in the forward traffic-channel communications received from the RAN. The active WCD may compare the calculated communication error rate to a target communication error rate and thereby decide whether to increase or decrease the WCD's power level set point.

For instance, if a WCD's calculated communication error rate is greater than the WCD's target communication error rate, the WCD may increase the WCD's power control set point. Alternatively, if a WCD's calculated communication error rate is less than the WCD's target communication error rate, the WCD may decrease the WCD's power control set point.

Typically, an active WCD will send PPCs to the RAN more frequently than the active WCD adjusts the power control set point. For example, an active WCD may send to the RAN 800 PCCs per second, whereas the active WCD may adjust the power control set point twice per second. Other rates of sending PCCs and adjusting power control set points are possible as well.

Additionally, a similar power control process may carried out by the RAN to control the reverse-link transmission power of each WCD.

As a result of active WCDs regularly sending PCCs directed to the RAN, the RAN may regularly receive PCCs from active WCDs. (It should be understood, however, that the RAN may fail to receive some PCCs sent by the active WCD due to poor reverse-link conditions or other factors.) In response to each PCC received from the active WCD, the RAN may then responsively adjust its forward link transmission power to the active WCD in accordance with the PCC. For instance, in response to receiving a power up command from the active WCD, the RAN may increase its forward link transmission power to the active WCD. And in response to receiving a power down command from the active WCD, the RAN may decrease its forward link transmission power to the active WCD.

In some protocols, the RAN may have a limit on the total amount of transmission power the RAN can use in a given coverage area. Such a limit is referred to as the "maximum allowable power level." The maximum allowable power level may be set by a system designer or system operator, with one example being 80 watts (though other examples are possible as well).

Similarly, the RAN may have a limit on the amount of forward link transmission power the RAN can use for transmission to any one WCD. For instance, the RAN may maintain a "channel-maximum" power parameter that defines this limit (e.g., 2.4 watts per WCD). Alternatively, the RAN may have a separate channel-maximum power parameter for each individual traffic channel, with the parameters possibly taking on different values (e.g., 2.4 watts for a first traffic channel and 2.0 watts for a second traffic channel).

OVERVIEW

In theory, the above power control process provides the framework for an active WCD and the RAN to find a balance between keeping traffic channel transmission power levels strong enough to overcome interference and preventing traffic channel transmission power levels from becoming unnecessarily strong. However, in practice, certain situations may arise that lead to forward link transmission power levels in a coverage area becoming unnecessarily strong. Disclosed herein is a method and corresponding system that deals with these situations by reducing the total forward link transmission power (referred to as "aggregate transmission power level") in a coverage area.

According to a first embodiment of the method, the RAN may reduce the aggregate transmission power level in a given coverage area by (i) determining which WCDs in the given coverage area have a communication error rate that is at least a threshold level of communication error rate, and (ii) in response to the determining, reducing the forward link transmission power level of the determined WCDs.

In some applications of the first embodiment, the threshold level of communication error rate may be equal to the greatest communication error rate of all active WCDs in the given coverage area. Thus, in some respects the method may entail reducing the forward link transmission power of a particular WCD in response to determining that the particular WCD has the highest communication error rate of all WCDs in the given coverage area. In other applications of the first embodiment, the threshold level of communication error rate may be less than the highest communication error rate of all active WCDs in the given coverage area.

According to a second embodiment of the method, the RAN may reduce the aggregate transmission power level in a coverage area by reducing the forward link transmission power of WCDs that have (i) a forward link transmission power level that is at least a threshold level of forward link transmission power and (ii) a communication error rate that is at least a threshold level of communication error rate.

In some applications of the second embodiment, the threshold level of forward link transmission power may be equal to the greatest forward link transmission power level the RAN uses for transmission to all WCDs in a coverage area. Thus, in some respects the method may entail reducing the forward link transmission power of WCDs in a coverage area that have (i) the greatest forward link transmission power of all WCDs in that coverage area and (ii) a communication error rate that is at least a threshold level of communication error rate.

In other applications of the second embodiment, the threshold level of communication error rate may be equal to the greatest communication error rate of the WCDs that have the greatest forward link transmission power in the coverage area. Thus, in some respects the method may also entail determining which WCDs in a coverage area have the greatest forward link transmission power of all WCDs in the coverage area, and of those determined WCDs, reducing the forward link transmission power of the WCD(s) that have the highest communication error rate.

In still other applications of the second embodiment, the threshold level of forward link transmission power may be less than the greatest forward link transmission power level the RAN uses for transmission to all WCDs in a coverage area. And in still other applications of the second embodiment, the threshold level of communication error rate may be less than the greatest communication error rate of the WCDs that have the greatest forward link transmission power in the coverage area.

The RAN may carry out the disclosed method in response to the RAN determining that the RAN's aggregate transmission power level in a coverage area is at least a threshold level of aggregate transmission power. Alternatively, the RAN may carry out the disclosed method at any time.

One way for the RAN to reduce the forward link transmission power of a WCD is for the RAN to cause the WCD to send one or more power down commands to the RAN. To do this, the RAN may send to the WCD a message that causes the WCD to increase the WCD's target communication error rate beyond the WCD's calculated communication error rate. According to the power control process discussed above, if the WCD's target communication error rate is greater than the WCD's communication error rate, the WCD will decrease the WCD's power level set point. In turn, this may cause the WCD to send one or more power down commands to the RAN, and the RAN may responsively lower the WCD's forward link transmission power.

Another way for the RAN to reduce the forward link transmission power of a WCD is for the RAN to reduce the appropriate channel-maximum power parameter. For example, if a given WCD is receiving forward link communications on a first traffic channel, the RAN may reduce the channel-maximum power level parameter that applies to that first traffic channel. Other methods for reducing the forward link transmission power of a WCD may be possible as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Communication System Architecture

Figure 1:
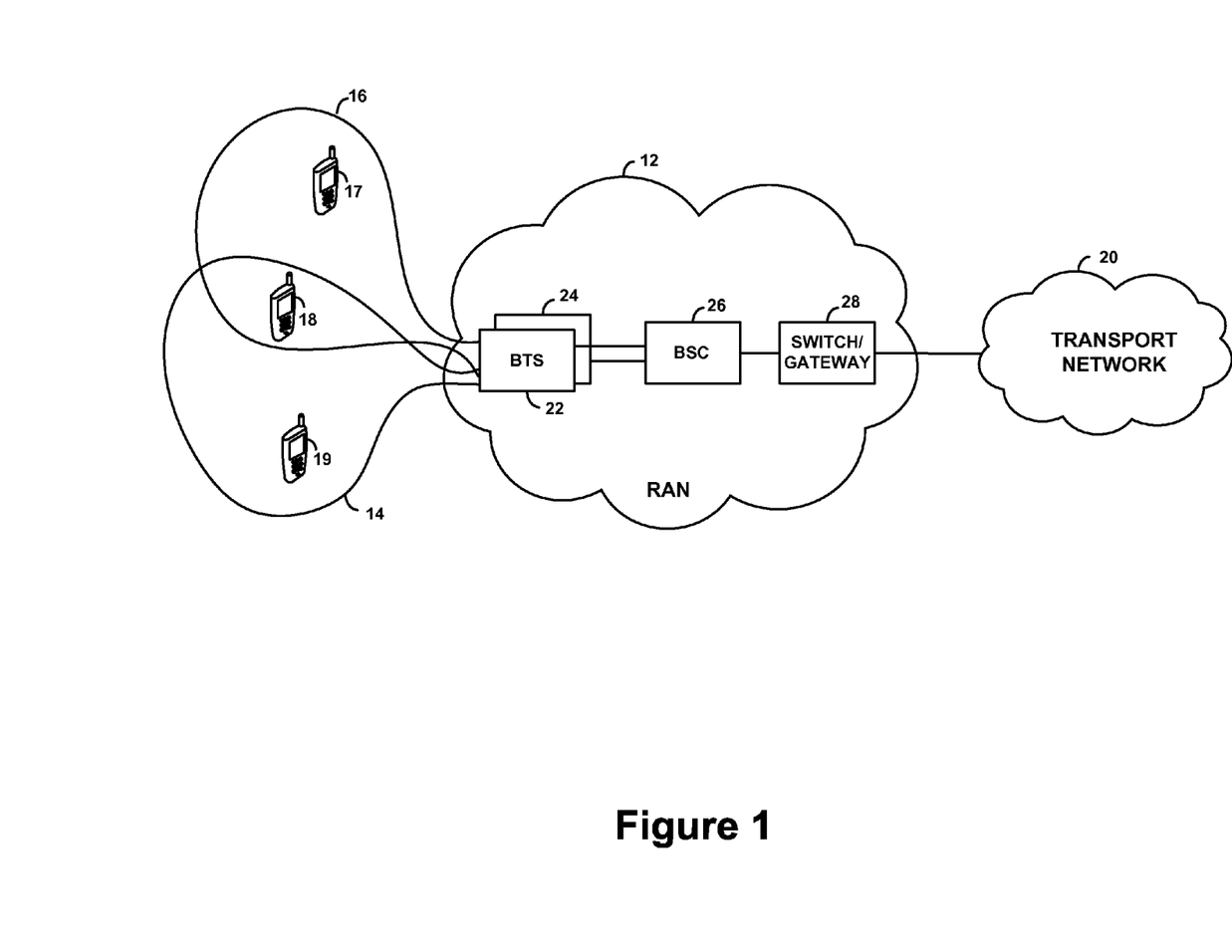
FIG. 1 is a block diagram illustrating an example communication system in which an exemplary embodiment of the present method can be employed.

Referring to the drawings, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

As shown in FIG. 1, the exemplary network includes at its core a radio access network (RAN) 12 that radiates to define a plurality of wireless coverage areas, including representative coverage areas 14 and 16. Shown operating in the various coverage areas by way of example are wireless communication devices (WCDs) 17, 18, 19 which communicate over the air with the RAN 12. A WCD, such as WCD 18, may be under the coverage of both coverage areas 14 and 16. In practice, RAN 12 may also be coupled with one or more transport networks, such as representative network 20. With this arrangement, each served WCD can engage in wireless communication with the RAN and may thereby communicate with other entities, such as other WCDs served by the RAN or with entities on transport network 20. Other RANs (not shown) may exist as well.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network.

At a more complex level (as shown), but still by way of example, the RAN may be a cellular radio access network. As shown, such a network may have a plurality of base transceiver stations (BTSs) (or more generally "base stations"), including representative BTSs 22 and 24, each of which provides antenna elements that radiate to define a respective coverage area and perhaps a set of coverage areas. In that arrangement, each of the coverage areas 14 and 16 may comprise one or more sectors and/or one or more cell sites for instance. In one example, coverage area 14 may correspond to an area defined by a radiation pattern of BTS 22 while coverage area 16 may correspond to an area defined by a radiation pattern of BTS 24. In another example, coverage areas 14 and 16 may each correspond to areas defined by radiation patterns of the same BTS (e.g., BTS 22). The BTSs are in turn shown coupled with a base station controller (BSC) 26, which is then coupled with a switch or gateway 28 that provides connectivity with transport network 20.

RAN 12 may operate according to IS-95, iDEN, CDMA, EV-DO, iDEN, TDMA, AMPS, AMPA, GSM, GPRS, MMDS, UMTS, EDGE, WiMAX (e.g., IEEE 802.16), LTE, microwave, satellite, Wi-Fi (e.g., IEEE 802.11), Bluetooth, and/or any other wireless protocol or protocols now known or later developed.

As described above, an air interface protocol will generally define a "forward link" encompassing communications from the BTS to active WCDs and a "reverse link" encompassing communications from active WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., an overhead channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs during a communication session. And the reverse link, for example, may define (i) access channels on which WCDs may transmit "access attempts" such as registration messages and/or call origination requests, and (ii) traffic channels on which WCDs may transmit bearer traffic for receipt by the RAN during a communication session.

According to some wireless protocols, the RAN may assemble data intended for WCDs into units called data frames and send the frames to the active WCDs at the same time. In order to transmit to multiple WCDs at the same time, the RAN may encode with a unique, traffic channel specific code (referred to as a Walsh code) the data frames that the RAN intends to transmit on each traffic channel. For instance, data frames that the RAN intends to send on a first traffic channel may be encoded with a first Walsh code, whereas data frames that the RAN intends to send on a second traffic channel may be encoded with a second Walsh code. The RAN may then simultaneously transmit to the active WCDs the encoded data frames and, consequently, the active WCDs may receive from the RAN the transmitted data frames. In order for a given WCD to receive the specific data frames that were intended for the given WCD, the given WCD may decode, using a traffic channel specific Walsh code, the received data frames. In line with the example above, for instance, if a given WCD is assigned to receive forward link transmissions on the second traffic channel, then the given WCD will use the second Walsh code to decode the received transmissions.

A drawback to this simultaneous communication technique is that two or more simultaneous transmissions may manifest as interference (i.e., noise) to each other. In other words, a transmission on one forward link traffic channel (destined, for example, to a given active WCD) may be perceived as noise by other active WCDs that are simultaneously receiving transmissions on other forward link traffic channels. The amount of noise perceived by each active WCD may be directly proportional to the forward link transmission power levels of the simultaneous communications. Thus, as forward link transmission power on a traffic channel rises, so too may the noise perceived by active WCDs receiving forward link transmissions on other traffic channels.

Generally, an increase in forward link noise results in an increase in forward link communication errors. Data frames usually contain some amount of forward error correction to account for a limited number of communication errors. However, as a result of increased noise, the number of errors in a data frame may rise to a point where the forward error correction cannot correct them all. Consequently, the active WCD may incorrectly decode that data frame.

Over a period of time, an active WCD may compute a ratio of (i) the number of frames that the active WCD incorrectly decodes to (ii) the total number of frames that the WCD receives. This ratio is called the frame error rate (FER). The FER is an indication of the RF conditions of the forward link, and consequently the quality of service provided by the RAN. For instance, frame errors may manifest as lost audio samples, which in turn may cause choppy or distorted audio output when played out by a receiving device. Similarly, frame errors may represent packet-data loss that may result in retransmissions and lower overall throughput.

Periodically, an active WCD may send to the RAN indications of that active WCD's FER (or other communication error rate). The active WCD may send these indications in a specific error rate reporting message or perhaps in some other message that the active WCD sends to the RAN. In a given coverage area, the RAN may receive from each active WCD in that coverage area indications of the active WCDs' communication error rates. The RAN may use these indications, for instance, to determine which WCDs in the coverage area are experiencing an acceptable level of quality of service and which are not.

The computed FER is one type of communication error rate that an active WCD may use as a basis for adjusting the active WCD's power level set point up or down. For instance, an active WCD may compare the active WCD's computed FER to a target frame error rate (TFER) and thereby decide whether to increase or decrease the active WCD's power level set point. The active WCD may increase the power level set point when the FER is greater than the TFER and may decrease the power level set point when the FER is less than the TFER. One example value of a TFER is 1%, though other TFER values are possible as well. Additionally, other types of communication error rates can be used as a basis for adjusting an active WCD's power control set point.

As the noise level in a coverage area rises, the number of incorrectly decoded data frames may also rise, leading to a higher FER for an active WCD. And according to the power control process discussed above, if the active WCD's FER rises above beyond the active WCD's TFER, the active WCD will increase the power level set point and likely ask the RAN to increase the forward link transmission power (via one or more power up commands). Naturally, a cyclical pattern ensues, whereby the RAN increases forward link transmission power, followed by an increase in noise for active WCDs, followed by the active WCDs requesting the RAN to increase forward link transmission power.

Eventually, this cyclical effect (referred to as "noise rise") may cause the aggregate transmission power level in a coverage area to approach the maximum allowable power level in that coverage area. Once the RAN reaches this maximum allowable aggregate power level in a given coverage area, the RAN may not be able to increase the transmission power of active WCDs in that given coverage area (since doing so would exceed the maximum allowable aggregate power level). This may result in a poor user experience for active WCDs in the given coverage area that request a power increase but do not get one. Furthermore, WCDs in neighboring coverage areas ("neighbor WCDs") may not be able to come into the given coverage area and receive service from the RAN since the RAN may not be able to devote any new transmission power to those neighbor WCDs. This may result in a poor user experience for these neighbor WCDs too.

2. Exemplary Operation

As the aggregate transmission power level in a coverage area approaches the maximum allowable aggregate power level, the RAN may reduce the aggregate transmission power in the coverage area by reducing the forward link transmission power of one or more WCDs in the coverage area. In theory, reducing forward link transmission power of one or more WCDs may set off a "chain-reaction" of forward link power reduction whereby other WCDs in the coverage area ask the RAN (via one or more power down commands) to reduce the forward link transmission power.

For instance, reducing the forward link transmission power of a few WCDs may reduce the amount of noise perceived by other WCDs in the coverage area. In turn, this may cause the FERs of those other WCDs to decrease, thus causing those WCDs to ask the RAN for a decrease in forward link transmission power (via one or more power down commands). This additional decrease in forward link transmission power may reduce the amount of noise perceived for still other WCDs, possibly resulting in reduced FERs for those other WCDs. Consequently, the other WCDs may ask the RAN for reduced forward link transmission power.

Figure 2:
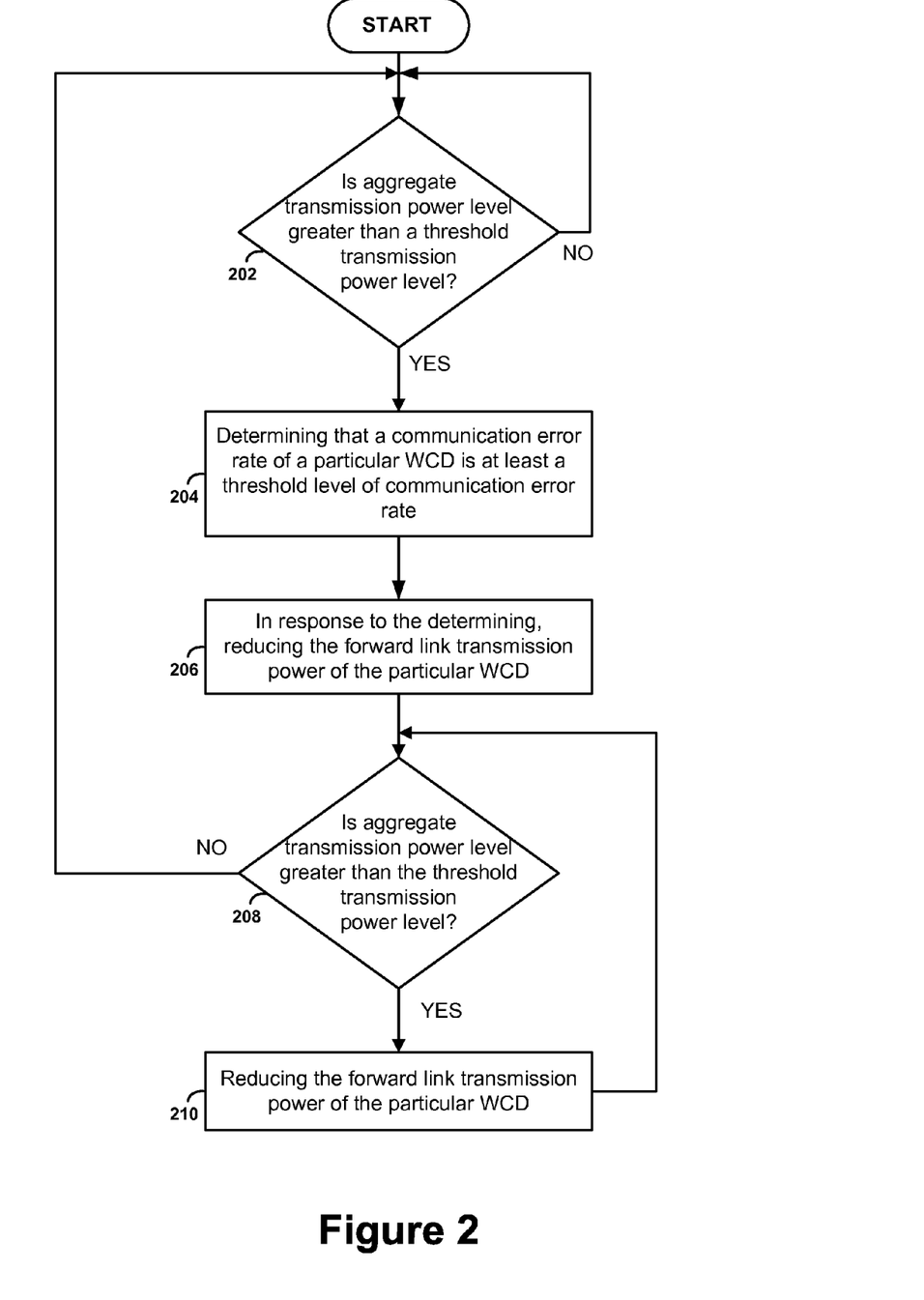
FIG. 2 is a flow chart illustrating functions that can be carried out in accordance with an exemplary embodiment of the present method.

FIG. 2 is a flow chart depicting functions that can be carried out by a RAN (e.g., RAN 12) in accordance with the present method. In particular, FIG. 2 depicts a method for reducing aggregate forward link transmission power.

As shown in FIG. 2, the method begins at step 202, where the RAN determines whether the aggregate transmission power level in a given coverage area is greater than a threshold transmission power level. The threshold transmission power level may be a specific power level (e.g., 60 watts) or a percentage of the maximum allowable aggregate power level (e.g., 75% of the maximum allowable aggregate power) in the given coverage area. If the aggregate power level in the given coverage area is not greater than the threshold level, the method remains at step 202. If the aggregate transmission power level is greater than the threshold level, the method continues at step 204. Thus, in one embodiment of the method, the RAN carries out the remaining steps of the method of FIG. 2 in response to determining that the aggregate transmission power level in a coverage area is greater than a threshold level of transmission power. In another embodiment however, the RAN may omit step 202 and carry out the remaining steps of the method of FIG. 2 at any time.

At step 204, the RAN determines that a communication error rate (e.g., an FER) of a particular WCD is at least a threshold level of communication error rate. The RAN may, for example, set the threshold level of communication error rate to be equal to the greatest communication error rate of all WCDs in a particular coverage area. As discussed above, the RAN may receive from the active WCDs in the particular coverage area indications of the active WCDs' communication error rates. Based on these error rate indications, the RAN can determine which error rate is the greatest and set the threshold level of communication error rate equal to that greatest error rate. Thus, in one respect, step 204 may take the form of the RAN determining that a particular WCD operating in the particular coverage area has the highest communication error rate of all WCDs in that particular coverage area. Alternatively, the RAN may set the threshold level of communication error rate to be equal to something less than the greatest error rate of all WCDs in the particular coverage area.

At step 206, in response to the determining in step 204, the RAN reduces the forward link transmission power of the particular WCD determined in step 204. One way for the RAN to reduce a WCD's forward link power level is for the RAN to cause the WCD to increase the WCD's target communication error rate (e.g., TFER). For example, according to the power control process described above, if a WCD increases its target communication error rate to something greater than that WCD's computed communication error rate, that WCD will decrease its power level set point and likely ask the RAN to reduce the forward link transmission power.

The RAN may cause a WCD to increase that WCD's target communication error rate by sending a specific instruction to the WCD. The instruction may direct the WCD to increase the target communication error rate to a specific value (e.g., increase TFER to 5%), or the instruction may direct the WCD to increase the target communication error rate by a specific amount (e.g., increase the TFER by 0.5%). This instruction could take the form of a control message sent to the WCD on an overhead channel. Alternatively, the RAN may include the instruction in some other type of message that the RAN sends to the WCD. A RAN may cause a given WCD to increase the given WCD's target communication error rate according to other methods as well.

Another way for the RAN to reduce the particular WCD's forward link transmission power level is for the RAN to reduce the channel-maximum power parameter corresponding to the particular WCD's traffic channel. For instance, if a given WCD is receiving on a first traffic channel at 2.1 watts, the RAN could reduce the given WCD's forward link transmission power by decreasing the first traffic channel's maximum power parameter to something below 2.1 watts (e.g., 1.5 watts). This would temporarily result in the given WCD receiving at a higher forward link power level than the traffic channel allows. Consequently, the RAN will reduce the WCD's forward link transmission power to be in line with the channel-maximum power parameter.

After reducing the particular WCD's forward link transmission power, the RAN may engage in an optional iterative power control reduction process illustrated by steps 208 and 210. For instance, at step 208, the RAN may determine if the aggregate transmission power level in the given coverage area is greater than a threshold level of transmission power. This threshold level may be the same threshold level as in step 202 (e.g., 75% of the maximum allowable aggregate power) or it may be a different threshold level. If the aggregate transmission power level in the given coverage area is not greater than the threshold level, the RAN exits the iterative power control reduction process and returns to step 202. If the aggregate transmission power level in the given coverage area is greater than the threshold level, the method continues at step 210.

At step 210, the RAN again reduces the forward link transmission power of the particular WCD. The RAN may reduce the particular WCD's forward link transmission power by the same amount as in step 206, or perhaps by a different amount. The RAN may reduce the particular WCD's forward link transmission power according to any of the methods described above. After this additional forward link power reduction in step 210, the method continues at step 208. The method may proceed in this iterative loop of power control reduction until the RAN determines that the aggregate transmission power level in the given coverage area is not greater than the threshold level of aggregate transmission power. When this is determined, the method continues at step 202.

Figure 3:
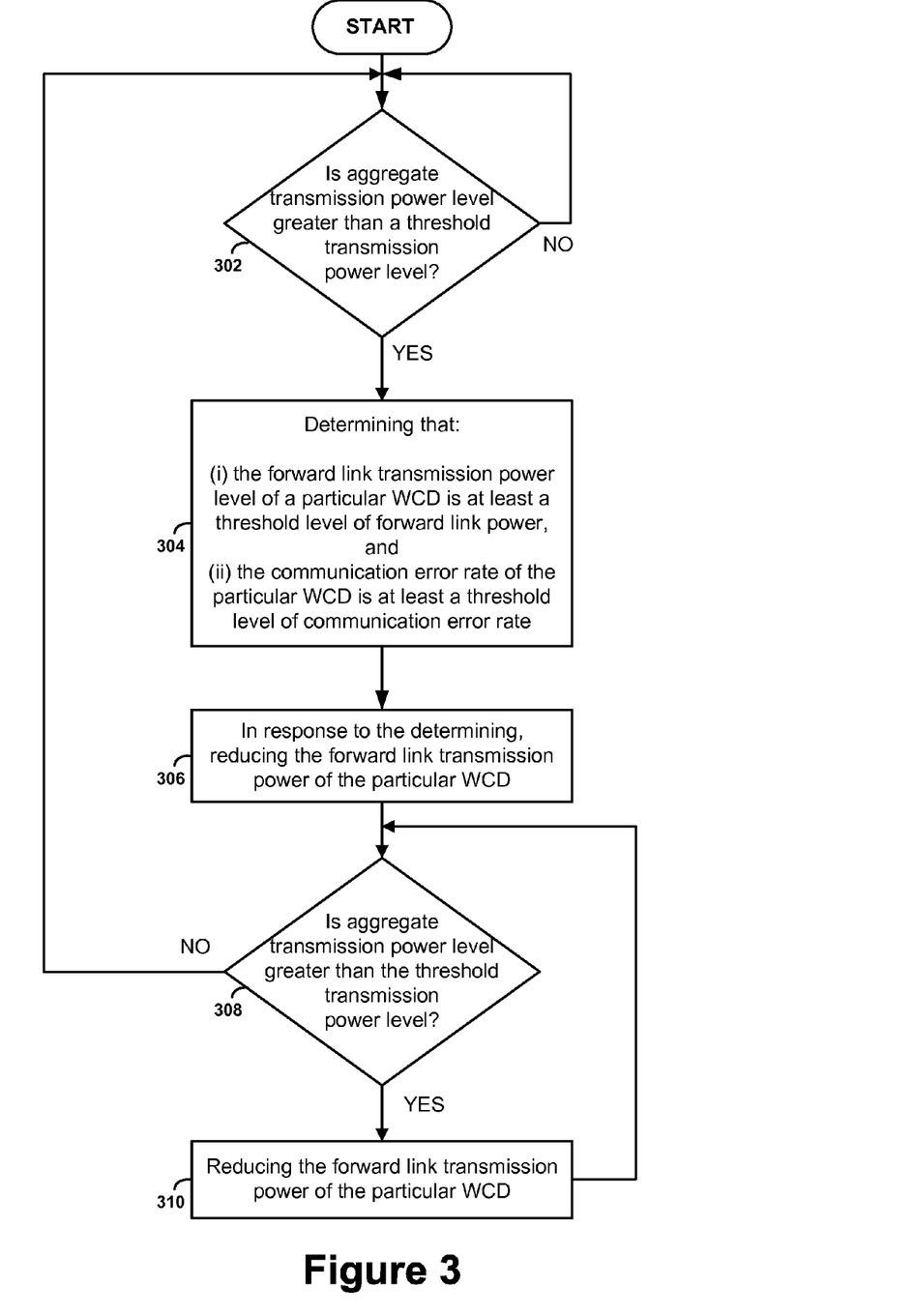
FIG. 3 is a flow chart illustrating additional functions that can be carried out in accordance with an exemplary embodiment of the present method.

FIG. 3 is a flow chart depicting additional functions that can be carried out in accordance with the present method. In particular, FIG. 3 depicts an additional method for reducing aggregate forward link transmission power.

As shown in FIG. 3, the method begins at step 302, where the RAN determines whether the aggregate transmission power level in a given coverage area is greater than a threshold transmission power level. The threshold transmission power level may be a specific power level (e.g., 60 watts) or a percentage of the maximum allowable aggregate power level (e.g., 75% of the maximum allowable aggregate power) in the given coverage area. If the aggregate transmission power level in the given coverage area is not greater than the threshold level, the method remains at step 302. If the aggregate transmission power level is greater than the threshold level, the method continues at step 304. Thus, in one embodiment of the method, the RAN carries out the remaining steps of the method of FIG. 3 in response to determining that the aggregate transmission power level in a coverage area is greater than a threshold level of transmission power. In another embodiment however, the RAN may omit step 302 and carry out the remaining steps of the method of FIG. 3 at any time.

At step 304, the RAN determines that (i) the forward link transmission power level of a particular WCD operating in the given coverage area is at least a threshold level of forward link power, and (ii) the communication error rate (e.g., an FER) of the particular WCD is at least a threshold level of communication error rate. The RAN may, for example, set the threshold level of forward link transmission power to be equal to the greatest forward link transmission power level of all WCDs in the given coverage area. Thus, in one respect, step 304 may take the form of the RAN determining a first set of WCDs that have the highest forward link transmission power, and of that first set of WCDs, determining that a particular WCD has a communication error rate that is at least a threshold level of communication error rate.

In line with the above example, the RAN may set the threshold level of communication error rate to be equal to the greatest communication error rate of all of the WCDs in the determined first set. Thus, step 304 may take the form of the RAN determining a first set of WCDs that have the highest forward link transmission power, and of that first set of WCDs, determining a particular WCD that has the highest communication error rate.

Alternatively, the RAN may set the threshold level of communication error rate equal to something less than the greatest communication error rate of the determined first set of WCDs. Likewise, the RAN may also set the threshold level of forward link transmission power to be equal to something less than the greatest forward link transmission power level of all WCDs in the particular coverage area.

At step 306, in response to the determining in step 304, the RAN reduces the forward link transmission power of the particular WCD determined in step 304. The RAN may reduce the particular WCD's forward link transmission power level according to any of the methods described above with respect to the method of FIG. 2.

After reducing the particular WCD's forward link transmission power, the RAN may engage in an optional iterative power control reduction process illustrated by steps 308 and 310. This process is similar to that described above with respect to the method of FIG. 2 and is not described again for sake of brevity.

3. Exemplary WCD Components

Figure 4:
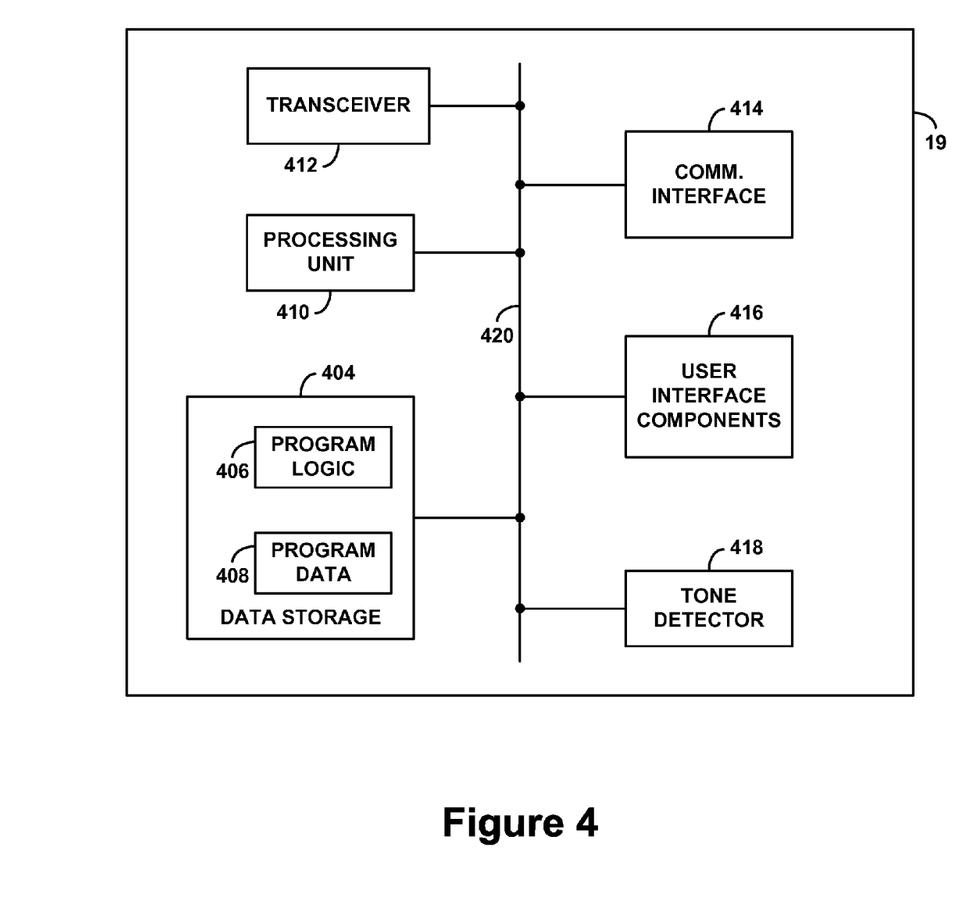
FIG. 4 is a block diagram illustrating an example wireless communication device that can be used in the arrangement of FIG. 1.

FIG. 4 is a simplified block diagram depicting functional components of an example WCD 19 that may be used in the arrangement of FIG. 1. The example WCD 19 could be a cell phone, a personal digital assistant (PDA), a pager, a wired or wirelessly-equipped notebook computer, or any other sort of device. As shown in FIG. 4, the example WCD 19 includes data storage 404, processing unit 410, transceiver 412, communication interface 414, user-interface components 416, and tone detector 418, all of which may be coupled together by a system bus 420 or other mechanism.

These components may be arranged to support operation of the WCD 19 in a CDMA compliant wireless communication network, such as RAN 12 illustrated in FIG. 1. The details of such an arrangement are well-known in the art and are not described further herein. Certain aspects of WCD 19 relevant to the methods described herein are discussed briefly below.

Communication interface 414 in combination with transceiver 412, which may include one or more antennas, enables communication with the network. Such communication may include as reception of data frames from the serving base station and transmission of one or more PCCs to the serving base station. The communication interface may include a module, such as an MSM™-series chipset made by Qualcomm Inc. of San Diego, Calif., and may support wireless packet-data communications according to a CDMA family of protocols.

Processing unit 410 comprises one or more general-purpose processors (e.g., INTEL microprocessors) and/or one or more special-purpose processors (e.g., dedicated digital signal processor, application specific integrated circuit, etc.). In turn, the data storage 404 comprises one or more volatile and/or non-volatile storage components, such as magnetic or optical memory or disk storage. Data storage 404 can be integrated in whole or in part with processing unit 410, as cache memory or registers for instance. In example WCD 19, as shown, data storage 404 is configured to hold both program logic 406 and program data 408.

In an alternative configuration, processing unit 410 may be embedded with the MSM™-series chipset, and thus may be part of communication interface 414.

Program logic 406 may comprise machine language instructions that define routines executable by processing unit 410 to carry out various functions described herein. In particular the program logic, communication interface, and transceiver may operate cooperatively to carry out logical operations such as those described herein.

It will be appreciated that there can be numerous specific implementations of a WCD, such as WCD 19, that may be used in the arrangement of FIG. 1. Further, given this disclosure, one of skill in the art would understand how to devise and build such an implementation.

4. Exemplary RAN Components

Figure 5:
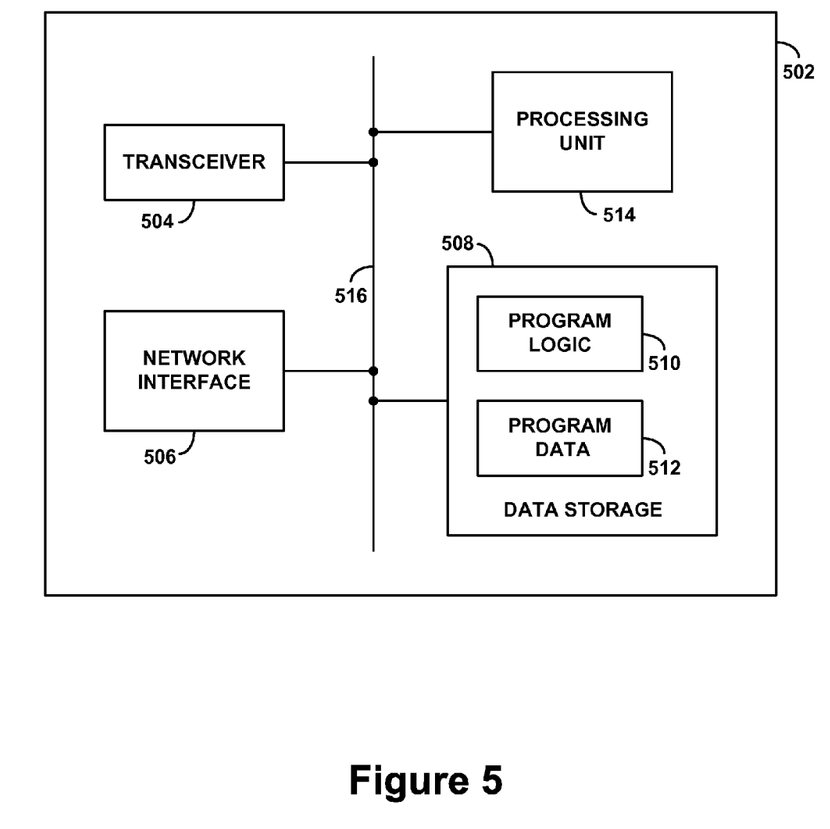
FIG. 5 is a block diagram illustrating an example base station in which an exemplary embodiment of the present method may be implemented.

FIG. 5 is a simplified block diagram depicting functional components of an example base station 502 in which any of the method steps described herein may be implemented. The example base station 502 may be representative of BTS 22, BTS 24 or BSC 26 integrated with BTS 22 and/or BTS 24 in FIG. 1, for instance. As shown in FIG. 5, base station 502 includes a transceiver 504, network interface 506, a processing unit 514, and data storage 508, all of which may be coupled together by a system bus 516 or other mechanism. In addition, the base station may also include external storage, such as magnetic or optical disk storage, although this is not shown in FIG. 5.

These components may be arranged to support conventional operation of the base station 502 in a CDMA compliant wireless communication network, such as RAN 12 illustrated in FIG. 1. The details of such an arrangement and how these components function to provide conventional operation are well-known in the art and are not described further herein. Certain aspects of base station 502 relevant to the method steps discussed herein are discussed briefly below.

Network interface 506 in combination with transceiver 504, which may include one or more antennas, enables communication on a network, such RAN 12. Accordingly, network interface 506 may take the form of trunk or optical link that can be coupled with switch/gateway 28, or any Ethernet network interface card or other physical connection that can be coupled with any other entity on the RAN 12 or transport network 20, for instance. Further, network interface 506 in combination with transceiver 504 enables air interface communication with one or more WCDs, supporting forward link transmissions of protocol version messages, among other message and commands, and supporting reception reverse-link traffic on reverse links. The interface 506 may also include a module, such as an CSM™-series chipset made by Qualcomm Inc. of San Diego, Calif., and may support wireless packet-data communications according to a CDMA family of protocols.

Processing unit 514 comprises one or more general-purpose processors (e.g., INTEL microprocessors) and/or one or more special-purpose processors (e.g., dedicated digital signal processor, application specific integrated circuit, etc.). In turn, the data storage 508 comprises one or more volatile and/or non-volatile storage components, such as magnetic or optical memory or disk storage. Data storage 508 can be integrated in whole or in part with processing unit 514, as cache memory or registers for instance. As further shown, data storage 508 is equipped to hold program logic 510 and program data 512.

Program logic 510 may comprise machine language instructions that define routines executable by processing unit 514 to carry out various functions described herein. In particular the program logic, communication interface, and transceiver may operate cooperatively to carry out logical operation such as that discussed above and illustrated in FIG. 2 and FIG. 3.

It will be appreciated that there can be numerous specific implementations of a base station (or BTS or other RAN element), such as base station 502, in which the functions and method steps described herein could be implemented. Further, given this disclosure, one of skill in the art would understand how to devise and build such an implementation. As such, base station 502 is representative of means for carrying out any of the functions and/or method steps described herein by way of example.

5. Conclusion

Various exemplary embodiments have been described above. Those skilled in the art will understand, however, that changes and modifications may be made to these embodiments without departing from the scope of the claims.

I claim:

1. In a wireless communication system in which a radio access network (RAN) serves one or more wireless communication devices (WCDs), each given WCD of the one or more WCDs having a respective forward link transmission power level at which the RAN transmits to the given WCD, a method comprising:
    the RAN determining that a communication error rate of a particular WCD of the one or more WCDs is greater than a threshold level of communication error rate; and
    responsive to the determining, the RAN reducing the forward link transmission power level of the particular WCD.

2. The method of claim 1, wherein the RAN reducing the forward link transmission power level of the particular WCD comprises:
    the RAN increasing a target communication error rate of the particular WCD.

3. The method of claim 2, further comprising:
    the RAN determining that the RAN is transmitting to the one or more WCDs at an aggregate transmission power level that is greater than a threshold transmission power level,
        wherein the method of claim 1 takes place in response to the RAN determining that the RAN is transmitting to the one or more WCDs at an aggregate transmission power level that is greater than a threshold transmission power level, and
        wherein the RAN increasing a target communication error rate of the particular WCD comprises the RAN increasing by a threshold step size the target communication error rate of the particular WCD.

4. The method of claim 3, wherein the RAN increasing by a threshold step size the target communication error rate of the particular WCD comprises:

the RAN increasing a target communication error rate of the particular WCD to a level that is greater than the communication error rate of the particular WCD.

5. The method of claim 3, further comprising:
the RAN continually increasing by the threshold step size the target communication error rate of the particular WCD; and
responsive to the RAN determining that the RAN is transmitting to the one or more WCDs at an aggregate transmission power level less than the threshold transmission power level, the RAN stopping continually increasing the target communication error rate of the particular WCD.

6. The method of claim 1,
wherein each WCD of the one or more WCDs has a respective communication error rate, and
wherein the RAN determining that a communication error rate of a particular WCD of the one or more WCDs is greater than a threshold level of communication error rate comprises the RAN determining that a communication error rate of a particular WCD of the one or more WCDs is equal to a greatest respective communication error rate of the one or more WCDs.

7. The method of claim 1, wherein the respective forward link transmission power level of the particular WCD is equal to a greatest forward link transmission power level used by the RAN for transmission to the one or more WCDs.

8. In a wireless communication system in which a radio access network (RAN) serves one or more wireless communication devices (WCDs), each given WCD of the one or more WCDs having a respective forward link transmission power level at which the RAN transmits to the given WCD, a method comprising:
the RAN determining that (i) the forward link transmission power level of a particular WCD of the one or more WCDs is at least a threshold level of forward link transmission power, and (ii) a communication error rate of the particular WCD is greater than a threshold level of communication error rate; and
responsive to the determining, the RAN reducing the forward link transmission power level of the particular WCD.

9. The method of claim 8, wherein the threshold level of forward link transmission power is equal to a greatest respective forward link transmission power level at which the RAN transmits to the one or more WCDs.

10. The method of claim 8, wherein each WCD of the one or more WCDs has a respective communication error rate, and wherein the RAN determining that a communication error rate of a particular WCD of the one or more WCDs is greater than a threshold level of communication error rate comprises the RAN determining that a communication error rate of a particular WCD of the one or more WCDs is equal to a greatest respective communication error rate of the one or more WCDs.

11. The method of claim 8, wherein each WCD of the one or more WCDs has a respective communication error rate, and wherein the RAN determining that a communication error rate of a particular WCD of the one or more WCDs is greater than a threshold level of communication error rate comprises the RAN determining that a communication error rate of a particular WCD of the one or more WCDs is equal to a greatest respective communication error rate of WCDs that have a forward link transmission power level at least as great as the threshold level of forward link power.

12. The method of claim 8, wherein for each given WCD of the one or more WCDs, the RAN maintains a respective power parameter value that defines a maximum allowable forward link transmission power level for the given WCD, and
wherein the RAN reducing the forward link transmission power level of the particular WCD comprises the RAN reducing the respective power parameter value of the particular WCD.

13. The method of claim 8, wherein the RAN reducing the forward link transmission power level of the particular WCD comprises:
the RAN increasing a target communication error rate of the particular WCD.

14. The method of claim 13, further comprising:
the RAN determining that the RAN is transmitting to the one or more WCDs at an aggregate transmission power level that is greater than a threshold level of aggregate transmission power,
wherein the method of claim 12 takes place in response to the RAN determining that the RAN is transmitting to the one or more WCDs at an aggregate transmission power level that is greater than a threshold level of aggregate transmission power, and
wherein the RAN increasing the target communication error rate of the particular WCD comprises the RAN increasing by a threshold step size the target communication error rate of the particular WCD.

15. The method of claim 14, further comprising:
the RAN continually increasing by the threshold step size the target communication error rate of the particular WCD; and
responsive to the RAN determining that the RAN is transmitting to the one or more WCDs at an aggregate transmission power level less than the threshold aggregate transmission power level, the RAN stopping continually increasing the target communication error rate of the particular WCD.

16. A radio access network (RAN) configured to serve one or more wireless communication devices (WCDs) over an air interface, each given WCD of the one or more WCDs having a respective forward link transmission power level at which the RAN transmits to the given WCD, the RAN comprising:
a non-transitory computer readable medium having instructions stored thereon, which, when executed by a processor, cause the RAN to carry out functions, the functions comprising:
the RAN determining that a communication error rate of a particular WCD of the one or more WCDs is greater than a threshold level of communication error rate; and
responsive to the determining, the RAN reducing the forward link transmission power level of the particular WCD.

17. The RAN of claim 16, wherein the functions further comprise:
the RAN determining that the RAN is transmitting to the one or more WCDs at an aggregate transmission power level that is greater than a threshold transmission power level,
wherein the functions of claim 16 take place in response to the RAN determining that the RAN is transmitting to the one or more WCDs at an aggregate transmission power level that is greater than a threshold transmission power level, and
wherein the RAN reducing the forward link transmission power level of the particular WCD comprises the RAN increasing a target communication error rate of the particular WCD.

18. The RAN of claim 17, wherein the RAN increasing the target communication error rate of the particular WCD comprises:
- the RAN increasing the target communication error rate of the particular WCD to a level that is greater than the communication error rate of the particular WCD.

19. The RAN of claim 17, wherein the RAN increasing the target communication error rate of the particular WCD comprises:
- the RAN continually increasing by a threshold step size the target communication error rate of the particular WCD; and
- responsive to the RAN determining that the RAN is transmitting to the one or more WCDs at an aggregate transmission power level less than the threshold transmission power level, the RAN stopping continually increasing the target communication error rate of the particular WCD.

20. The RAN of claim 16,
- wherein each given WCD of the one or more WCDs has a respective communication error rate, and
- wherein the RAN determining that a communication error rate of a particular WCD of the one or more WCDs is greater than a threshold level of communication error rate comprises the RAN determining that a communication error rate of a particular WCD of the one or more WCDs is equal to a greatest respective communication error rate of the one or more WCDs.

* * * * *